United States Patent [19]

Mueller

[11] Patent Number: 4,460,796

[45] Date of Patent: Jul. 17, 1984

[54] PURIFICATION OF POLYTETRAMETHYLENE ETHER-GLYCOLS

[75] Inventor: Herbert Mueller, Frankenthal, Fed. Rep. of Germany

[73] Assignee: BASF Aktiengesellschaft, Fed. Rep. of Germany

[21] Appl. No.: 347,581

[22] Filed: Feb. 10, 1982

[30] Foreign Application Priority Data

Feb. 27, 1981 [DE] Fed. Rep. of Germany ....... 3107449

[51] Int. Cl.³ .............................................. C07C 41/34
[52] U.S. Cl. .................................... 568/617; 568/621
[58] Field of Search ................................. 568/617, 621

[56] References Cited

U.S. PATENT DOCUMENTS

| | | | |
|---|---|---|---|
| 2,751,419 | 6/1956 | Hill et al. | 260/615 |
| 2,983,763 | 5/1961 | Krause | 568/621 |
| 3,016,404 | 1/1962 | Beauchamp et al. | 260/615 B |
| 3,030,426 | 11/1962 | Moseley et al. | 568/621 |
| 3,712,930 | 1/1973 | Matsuda et al. | 260/615 B |
| 3,833,669 | 9/1974 | Gehm et al. | 260/615 B |

FOREIGN PATENT DOCUMENTS 877269  9/1961  United Kingdom .

*Primary Examiner*—Howard T. Mars
*Attorney, Agent, or Firm*—Keil & Weinkauf

[57] ABSTRACT

Polytetramethylene etherglycols are purified by treating the alkaline catalysts with orthophosphoric acid in an equivalence ratio of from 1.5 to 2.5:3 and then separating off the inorganic salts formed.

1 Claim, No Drawings

PURIFICATION OF POLYTETRAMETHYLENE ETHER-GLYCOLS

Polytetramethylene ether (PTHF) is usually prepared from tetrahydrofuran using a cationic catalyst system, a polytetramethylene ether with various end groups, determined by the initiator system, being obtained. PTHF accordingly has the general formula $$X-[(CH_2)_4-O]_m-(CH_2)_4-Y$$

where X and Y can be, for example, the groupings below and n is the valency of the Lewis acid $MX_n$:

| Catalyst system | X | Y |
|---|---|---|
| $R_3O^+MX_{n+1}^-$ | RO— | —OH |
| $FSO_3H$ | $HSO_3$— | —F |
| $AlCl_3/CH_3COCl$ | $CH_3COO$— | —Cl |
| $HClO_4/CCH_3CO)_2O$ | $CH_3COO$— | —OOCCH$_3$ |
| $SbCl_5/(CH_3CO)_2O$ | $CH_3COO$— | —OOCCH$_3$ |

The preparation of polyurethanes, which is the main field of use of PTHF, requires polyethers in which the end groups X and Y are hydroxyl. The end groups in the polymer first obtained must therefore first of all be converted into hydroxyl by suitable measures, for example by hydrolysis or trans-esterification in the presence of an acidic or alkaline catalyst. Examples of suitable alkaline catalysts are alkali metal and alkaline earth metal alcoholates and hydroxides, alkali metal carbonates and ammonium hydroxide. When the hydrolysis or alcoholysis has ended, the basic catalyst added must be virtually completely removed from the resulting polytetramethylene ether-glycols in a simple manner and without loss of useful product.

U.S. Pat. No. 3,712,930 discloses a process for the purification of polytetramethylene ether-glycols in which water is incorporated in the reaction mixture, the non-polymerized tetrahydrofuran is distilled off and the sulfuric acid ester radicals on the polymer ends are hydrolyzed at from 90° to 100° C. The reaction mixture is then cooled and the upper oily layer is separated off and subjected to neutralization, dehydration and demineralization in order to obtain a purified polymer product.

U.S. Pat. No. 2,751,419 discloses an expensive purification operation carried out with the aid of countercurrent extraction and using calcium hydroxide as the neutralizing agent. In these purification methods, the polytetramethylene ether-glycol comes into contact with water. However, it is extremely difficult to separate water from the polymer solution in the neutral range, since the polymer solution and water form emulsions which increase in stability the closer the pH of the mixture comes to the neutral point. Industrially therefore, the polymer in this case also is first dissolved in a hydrocarbon, preferably toluene, and the solution is washed neutral.

German Laid-Open Application DOS No. 2,746,911 also shows how difficult and complex the problem is, and at the same time discloses a method in which strongly basic polystyrene anion exchangers are used to neutralize the polymers after the hydrolysis. Since the neutralization capacity of the ion exchangers, based on their weight, is low, relatively large amounts (from 5 to 20% by weight) must be used for the neutralization; this represents, however, a substantial cost factor.

Numerous processes for purifying polyalkylene ethers, which are prepared by polymerization of an alkylene oxide in the presence of a basic catalyst, have also been disclosed.

In general, the alkali-containing polymers are neutralized with inorganic or organic acids, whereupon emulsions of aqueous salt solutions and polyalkylene ethers are formed. The water is then distilled off from the emulsions, while the temperature is continuously increased. The precipitated salts which remain in the polyether are separated off mechanically.

If an inorganic acid, such as sulfuric acid, phosphoric acid or hydrochloric acid, an acidic salt, such as potassium hydrogen phosphate, or an organic acid, such as citric acid, tartronic acid and the like, are used for neutralizing the polymers, the neutralization must be carried out exactly to the equivalence point in order to obtain a minimum of basic residual alkali metal salts on the one hand and a minimum excess of acid on the other hand. Moreover, the alkali metal salt frequently precipitates as crystals which are so fine that filtration presents difficulties, even when filtration auxiliaries are used. The polyalkylene ethers can also become discolored, especially if sulfuric acid is used.

U.S. Pat. No. 3,016,404 discloses that the difficulty of having to establish the equivalence point exactly in the neutralization can be eliminated by using a volatile acid, such as hydrogen chloride. The excess hydrogen chloride is distilled off as a gas. The process has the disadvantage that the hydrogen chloride is highly corrosive to the vessel material and the excess gas must be separated off or destroyed, with the aid of expensive absorption and washing towers, in order to avoid air pollution.

U.S. Pat. No. 3,833,669 discloses that satisfactory results are achieved when alkylene oxides are polymerized using basic catalysts and the catalysts are then precipitated with carbon dioxide in the presence of basic magnesium salts.

British Pat. No. 877,269 discloses the use of acid-treated absorbent earths or clays for neutralizing the polyalkylene ethers. The disadvantage of this process is the handling of the solids, which can present difficulties, particularly if the reaction batches are relatively large, since up to about 4% by weight of such earths, based on the weight of polyether, is required for neutralizing the polymers. Such earths must be filtered through a very dense filter material in order to obtain a clear filtrate, and this in turn results in long filtration times.

As already stated, the polyalkylene ethers are purified by dilution with a water-insoluble solvent and washing of the resulting solution with water. However, the subsequent solvent regeneration makes apparatus for the process expensive. Another difficulty is that emulsification readily takes place.

Processes in which the reaction solution is neutralized by ion exchangers are also expensive with regard to equipment and the use of auxiliaries. They must be carried out in the presence of diluents, which subsequently have to be separated off and regenerated. The ion exchangers must be washed completely product-free before regeneration, in order to avoid high product losses.

For the above reasons, industrial preparation by conventional methods of polyalkylene ethers which are simultaneously ash-free, colorless and odorless has not hitherto been possible in many cases without tedious after-treatment of the products.

The present invention avoids these disadvantages and provides an industrially simple process for the preparation of pure, exactly reproducible polytetramethylene ether-glycols with acid and base numbers of zero by precipitation of the basic trans-esterification catalysts with orthophosphoric acid. The resulting salts can be separated off very easily by filtration, sedimentation or centrifugation, to give polytetramethylene ether-glycols which are free from any inorganic impurities.

The present invention relates to a process for the purification of polytetramethylene ether-glycols by neutralizing the alkaline catalyst with an acid and subsequently separating off the salts formed, wherein the alkaline catalyst is treated with orthophosphoric acid in an equivalence ratio of from 1.5 to 2.5:3.

It was surprising and in no way foreseeable that polytetramethylene ether-glycols can be purified in an extremely simple manner by the process according to the invention, since U.S. Pat. No. 3,016,404 discloses that syrupy phosphoric acid is absolutely unsuitable for neutralizing crude alkylene oxide polyethers. It was possible to precipitate all of the potassium ions only when a phosphoric acid:potassium ion equivalence ratio of not less than 3.0:1 was used. However, this led to polyoxyalkylene ethers with high acid numbers.

As stated above, polymers which, depending on the catalyst system and polymerization medium, usually have acyl, preferably acetyl, end groups are obtained from the polymerization of tetrahydrofuran. Polytetramethylene ether-glycol diacetates can be converted into the corresponding glycols by trans-esterification with a lower alcohol, preferably having from 1 to 4 carbon atoms, eg. methanol, ethanol or n-butanol, in the presence of a basic catalyst, such as an alkali metal alcoholate or hydroxide, e.g. sodium methylate, potassium isopropylate, sodium or potassium hydroxide, calcium oxide or calcium hydroxide.

In the process according to the invention, anhydrous orthophosphoric acid is preferably used for neutralizing the basic catalyst. However, the commercially available aqueous orthophosphoric acids, eg. syrupy (85% strength) phosphoric acid, are also suitable.

An essential feature of the process according to the invention is the use of the correct ratio of orthophosphoric acid to basic catalyst. Neutral polytetramethylene ether-glycols which are free from inorganic impurities are obtained only when the equivalence ratio of basic catalyst to orthophosphoric acid is from 1.5 to 2.5:3, preferably about 2:3. Polytetramethylene ether-glycols which fulfill most purity requirements can still be obtained if the equivalence ratio deviates very slightly from this value. However, an equivalence ratio outside the range from 1:3 to 3:3 must be avoided in all cases.

The neutralization temperature is of minor importance in the process, but is advantageously from 10° to 100° C., preferably from 20° to 60° C. Any increase in pressure has no effect on the neutralization. In contrast, it has proved advantageous to stir the mixture vigorously for some time, for example 0.5–5 hours, preferably 0.5–2 hours, after addition of the orthophosphoric acid and thereby to mix the reaction batch thoroughly.

After the neutralization and following a sufficient after-reaction time, the salts formed during neutralization can easily be separated off by a conventional method, eg. filtration or centrifugation. It is not necessary first to distill off any solvent present.

The Examples which follow illustrate the process according to the invention without limiting the scope thereof. Parts are by weight and bear the same relation to parts by volume as that of the kilogram to the liter.

EXAMPLE 1

450 parts of polytetramethylene ether-glycol diacetate which has been prepared by polymerization of tetrahydrofuran with fuller's earth as the catalyst and acetic anhydride as the regulator and has a mean molecular weight of 650, are mixed with 450 parts of methanol and 0.073 part of sodium methylate in a stirred vessel which can be heated and is surmounted by a fractionating column, the mixture is heated at the boiling point and the methyl acetate formed is distilled off as an azeotrope with methanol (19%) with a boiling point of 54° C. over the fractionating column (45 theoretical plates). As soon as the overhead temperature corresponds to the boiling point of pure methanol, the mixture is cooled to 50° C. and 0.078 part of 85% strength orthophosphoric acid is added. The mixture is stirred for a further hour and then filtered over a Seitz-Supra ® filter layer, Seitz-K 800. The colorless clear solution is freed from methanol by distillation. Polytetramethylene ether-glycol which has a mean molecular weight of 650 and an acid and base number of 0 mg of KOH/g, and is free from ash constituents, remains as the residue. No sodium or phosphate ions can be detected in the polymer.

In contrast, neutralization with sulfuric acid leads to a product either with a base number of 1.7 mg of KOH/g or with an acid number of 1.3 mg of KOH/g, depending on whether one or two equivalents of sulfuric acid are used. The poor filterability of the product is a particular nuisance in this case. The filtration rate of the product neutralized with phosphoric acid is 100 times greater than that of the product neutralized with sulfuric acid.

If an inorganic acid other than sulfuric acid, eg. hydrochloric acid or nitric acid, or an organic acid, eg. oxalic acid, formic acid, tartaric acid or citric acid, is used, the same problems arise as occur with neutralization with sulfuric acid. The polymer is difficult to purify by filtration and the acid and base numbers are from 1 to 2 mg of KOH/g.

I claim:

1. A process for the purification of polytetramethylene ether-glycols containing basic trans-esterification catalyst which comprises: adding to the polytetramethylene ether-glycol to be purified orthophosphoric acid to provide an equivalence ratio of basic catalyst to orthophosphoric acid of from 1.5 to 2.5:3 and thereby neutralize said basic catalyst, and thereafter separating the salts that are formed from the polytetramethylene ether-glycol, producing a polytetramethylene ether-glycol, free from any inorganic impurities and having an acid or base number of zero.

* * * * *